(12) United States Patent
Hoffman et al.

(10) Patent No.: US 7,637,985 B2
(45) Date of Patent: Dec. 29, 2009

(54) DRY COMPRESSED AIR SUPPLY MODULE

(75) Inventors: Fred W. Hoffman, Columbia Station, OH (US); Randall W. Nichols, Westlake, OH (US)

(73) Assignee: Bendix Commercial Vehicle Systems LLC

( * ) Notice: Subject to any disclaimer, the term of this patent is extended or adjusted under 35 U.S.C. 154(b) by 464 days.

(21) Appl. No.: 11/393,599

(22) Filed: Mar. 30, 2006

(65) Prior Publication Data

US 2007/0234904 A1 Oct. 11, 2007

(51) Int. Cl.
B01D 53/22 (2006.01)

(52) U.S. Cl. .................. 95/52; 95/19; 95/22; 95/45; 96/4; 96/8; 96/10; 96/11; 96/421; 55/385.3; 55/DIG. 17

(58) Field of Classification Search .......... 96/4, 96/8, 10, 11, 421, 108; 95/19, 22, 45, 52, 95/117, 121; 55/385.3, DIG. 17
See application file for complete search history.

(56) References Cited

U.S. PATENT DOCUMENTS

| | | | |
|---|---|---|---|
| 4,787,919 A * | 11/1988 | Campbell et al. | .............. 95/52 |
| 5,917,139 A | 6/1999 | Goodell et al. | |
| 6,074,462 A | 6/2000 | Quinn et al. | |
| 6,128,825 A * | 10/2000 | Cunkelman | .................. 95/52 |
| 6,391,098 B1 | 5/2002 | Thomas | |
| 6,537,039 B2 | 3/2003 | Mann | |
| 6,585,806 B2 | 7/2003 | Quinn et al. | |
| 6,616,735 B1 * | 9/2003 | Burban et al. | ............... 95/52 |
| 6,858,066 B2 | 2/2005 | Quinn et al. | |
| 6,881,245 B2 | 4/2005 | Nichols et al. | |
| 6,923,845 B2 | 8/2005 | Nichols et al. | |
| 2005/0168058 A1 | 8/2005 | Eberling et al. | |
| 2007/0125232 A1 * | 6/2007 | Wrosch et al. | ............... 96/4 |

FOREIGN PATENT DOCUMENTS

| | | | |
|---|---|---|---|
| DE | 195 38 339 A1 * | 4/1997 | |
| DE | 19538339 A1 | 4/1997 | |
| EP | 0995480 A | 4/2000 | |

OTHER PUBLICATIONS

International Search Report and Written Opinion of the International Searching Authority for PCT/US2007/004336, Mailed Aug. 17, 2007.

* cited by examiner

*Primary Examiner*—Jason M Greene
(74) *Attorney, Agent, or Firm*—Calfee, Halter & Griswold LLP

(57) ABSTRACT

A dry compressed air module is provided for attachment to the frame of commercial vehicle. The dry compressed air module includes a shell, an air compressor, an air dryer, and a reservoir. The air compressor, the air dryer, and the reservoir are disposed on the shell, and can be collectively attached to the frame using the shell. The air dryer is provided with compressed air from the air compressor, and the reservoir is provided with dry compressed air from the air dryer. The reservoir capable of storing and supplying the dry compressed air to the vehicle.

17 Claims, 3 Drawing Sheets

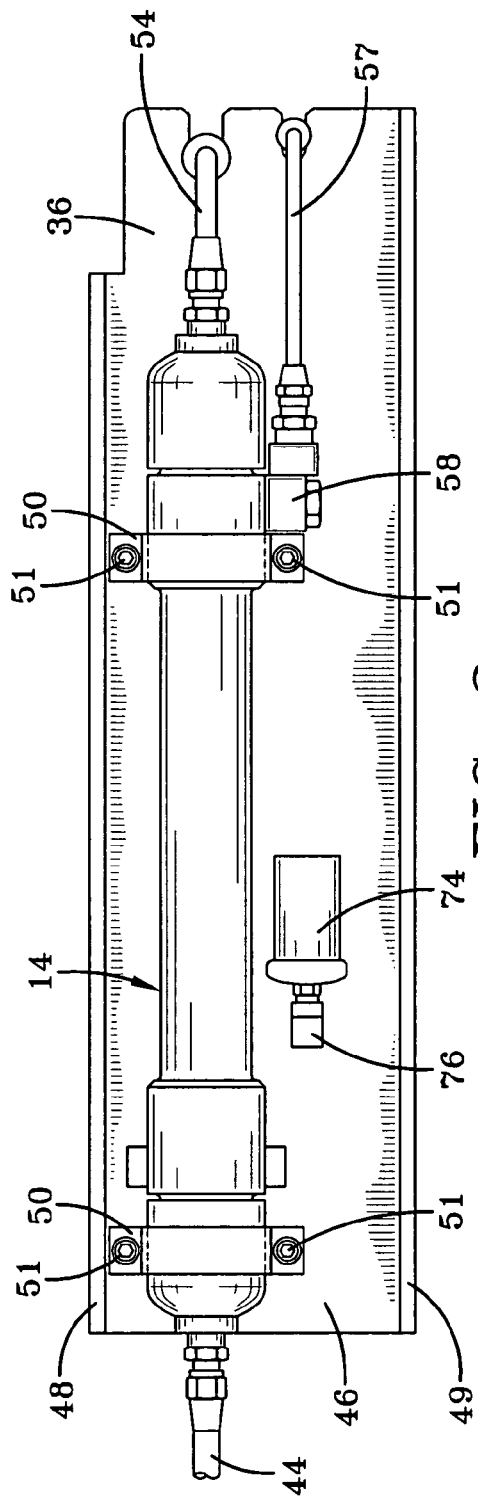
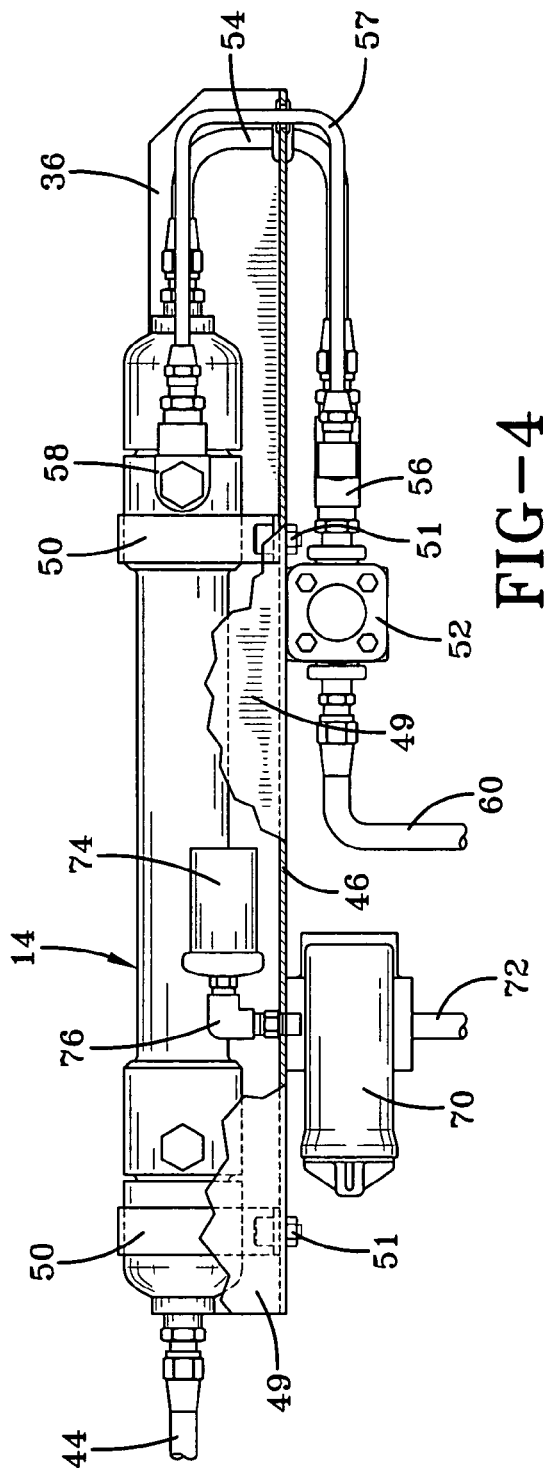

DRY COMPRESSED AIR SUPPLY MODULE

TECHNICAL FIELD

The present invention is generally related to a supply module for supplying dry compressed air to a commercial vehicle such as a bus or a truck. More particularly, the present invention is related to a supply module for supplying dry compressed air that can be attached to the frame of a commercial vehicle. More specifically, the present invention is related to a supply module that can be attached to a commercial vehicle to supply dry compressed air to equipment such as air horns, air suspension systems, and central tire inflation systems, and for augmenting air supply systems on an air-braked commercial vehicle.

BACKGROUND

Commercial vehicles such as buses and trucks require supplies of dry compressed air. For example, equipment such as air horns, air suspension, and central tire inflation systems require dry compressed air to function. Previously, it has been necessary to separately mount the components needed to generate the supply of dry compressed air on the commercial vehicles. For example, air compressors, air dryers, reservoirs, and other components have previously been individually mounted to the frames of commercial vehicles. Mounting the components separately requires separate mounting brackets, and can leave the components unprotected from road debris. Furthermore, separately mounting the components using separate mounting brackets can be time consuming. As such, there is need for an air supply module allowing an air compressor, a reservoir, an air dryer, and other components to be collectively mounted to the frame of a commercial vehicle, while simultaneously affording protection of these components from road debris.

DISCLOSURE OF THE INVENTION

The present invention contemplates a dry compressed air module attached to a frame of a vehicle including a shell for attachment to the frame, an air compressor disposed on the shell, an air dryer disposed on the shell, and provided with compressed air from the air compressor; and a reservoir disposed on the shell, and provided with dry compressed air from the air dryer, the reservoir capable of storing and supplying the dry compressed air to the vehicle, where the air compressor, the air dryer, and the reservoir can be collectively attached to the frame using the shell.

The present invention further contemplates a self-contained system for supplying dry compressed air to a destination including a shell, an air compressor disposed on the shell, an air dryer disposed on the shell, the air dryer fluidly communicating with the air compressor; and a reservoir disposed on the shell, the reservoir fluidly communicating with the air dryer, where the air compressor provides compressed air to the air dryer, the air dryer provides dry compressed air to the reservoir, and the reservoir stores the dry compressed air, and supplies the dry compressed air to the destination, the self-contained system capable of being modularly attached to the destination.

The present invention still further contemplates a module provided to supply dry compressed air to a destination including a means for generating compressed air, a means for drying the compressed air provided by the means for generating, a means for storing the dry compressed air provided by the means for drying; and a means for collectively attaching the means for generating, the means for drying, and the means for storing to the destination.

The present invention still further contemplates a method for supplying dry compressed air to a destination including providing an air compressor, an air dryer, and a reservoir on a shell, attaching the air compressor, the air dryer, and the reservoir collectively to the destination using the shell, generating compressed air using the air compressor, drying the compressed air provided by the air compressor using the air dryer, storing the dry compressed air provided by the air dryer using the reservoir, and providing the dry compressed air to the destination from the reservoir.

Further embodiments, variations, and enhancements are also described herein.

BRIEF DESCRIPTION OF THE DRAWINGS

FIG. 3 is an enlarged side elevational view of a channel bracket and an air dryer depicted in FIGS. 1 and 2; and FIG. 4 is an enlarged bottom fragmentary plan view of the channel bracket and the air dryer depicted in FIGS. 1 and 2.

DETAILED DESCRIPTION OF THE PRESENT INVENTION

The dry compressed air supply module of the present invention is generally indicated by the number 10 in the accompanying drawings. The supply module 10 can be attached to the frame F (FIG. 2) of a commercial vehicle to supply dry compressed air to air horns, air suspension systems, and central tire inflation systems, and/or augment air supply systems on an air-braked commercial vehicle.

Figure 1:
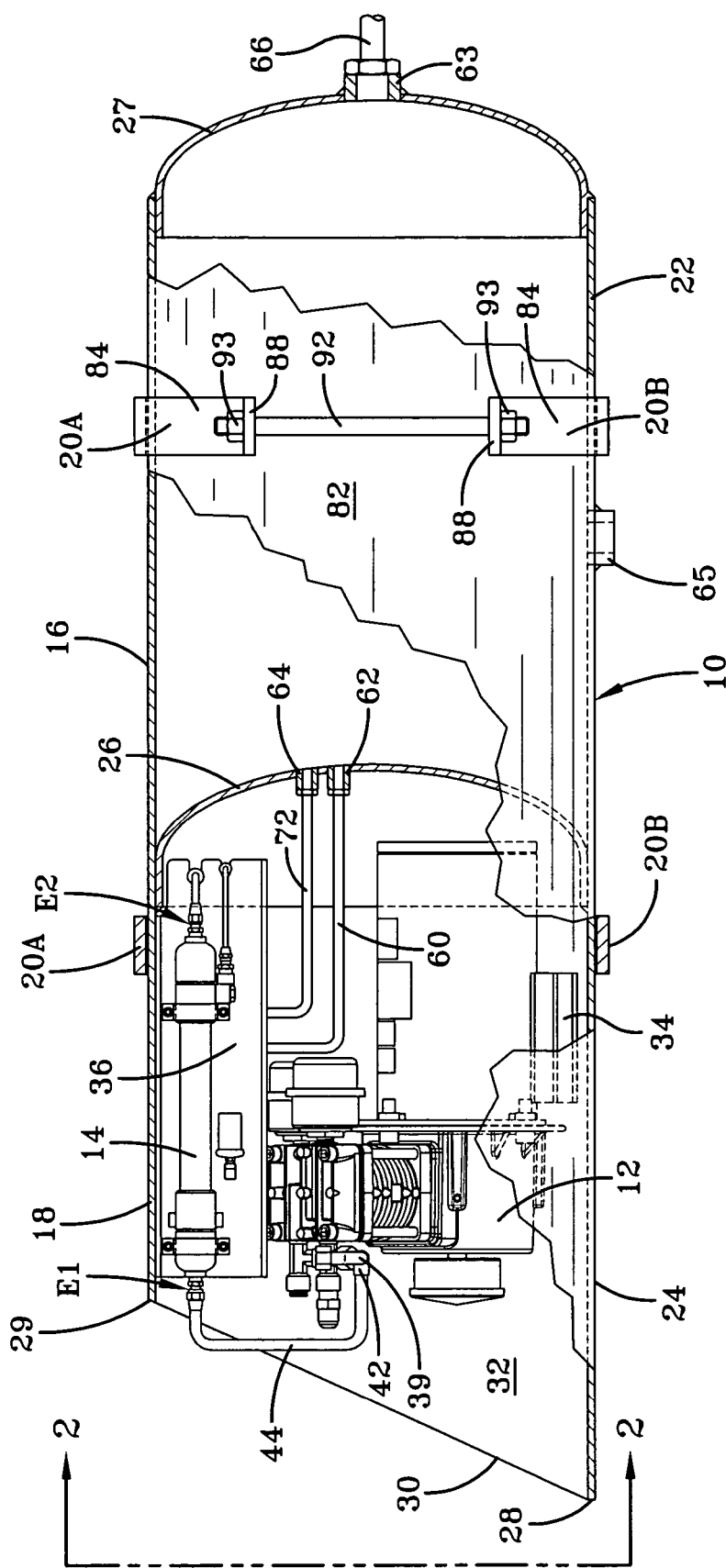
FIG. 1 is a side elevational view of the air supply module of the present invention.
Figure 2:
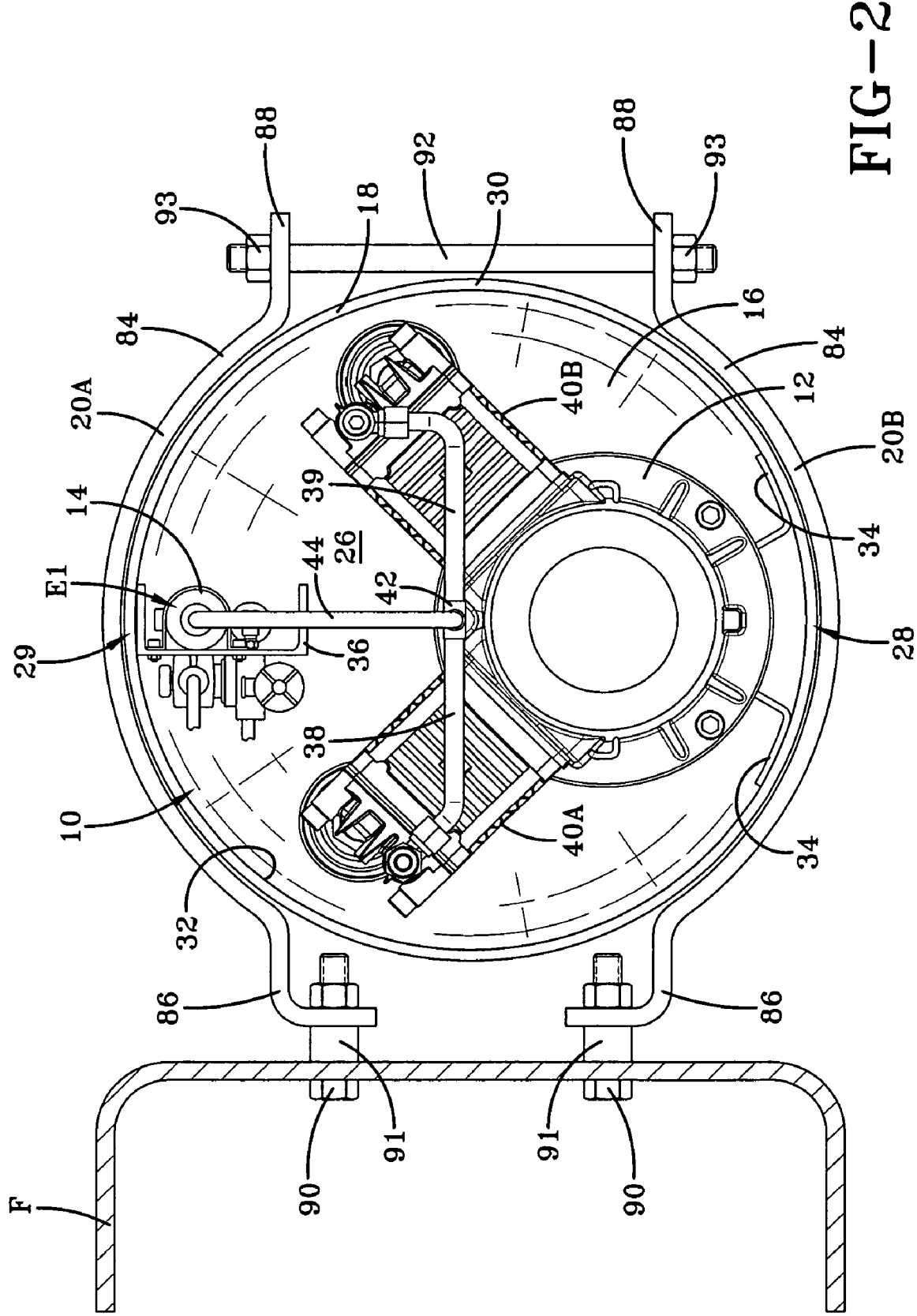
FIG. 2 is an enlarged front elevational view of the air supply module depicted in FIG. 1 attached to the frame of a commercial vehicle.

As depicted in FIGS. 1 and 2, the supply module 10 can include an air compressor 12, an air dryer 14, and a reservoir (or supply tank) 16, and is configured to be self-contained requiring only an electricity supply from a battery (not shown). Because the supply module 10 is self-contained, the attachment of the air compressor 12, air dryer 14, and reservoir 16 to the frame F is simplified.

The supply module 10 includes a shell 18 on which the air compressor 12, air dryer 14, and reservoir 16 are disposed. For example, the air compressor 12, air dryer 14, and reservoir 16 can be attached to and/or formed by the shell 18. The shell 18 provides for the modularity of the supply module 10 by allowing the air compressor 12, air dryer 14, and reservoir 16 to be collectively mounted to the frame F. As depicted in FIG. 2, the shell 18 is attached to the frame F using upper and lower clamping brackets 20A and 20B. Use of the clamping brackets 20A and 20B eliminates the need to separately mount the air compressor 12, air dryer 14, and reservoir 16 to the frame F.

The shell 18 includes a first section 22 and a second section 24 which can be formed separately or as one. Furthermore, the reservoir 16 can be attached to or formed by the first section 22. For example, as depicted in FIG. 1, the reservoir is formed by the first section 22, and bulkheads 26 and 27. As such, the first section 22 has a generally cylindrical shape to form the sidewalls of the reservoir 16, and the bulkheads 26 and 27 serve as the end caps of the reservoir 16. The first portion 22 and bulkheads 26 and 27 define the dimensions and the corresponding capacity of the reservoir 16.

Whether the first section 22 and second section 24 of the shell 18 are formed separately or as one, the second section 24 extends outwardly from the first section 22, and serves as a mounting platform for the air compressor 12 and air dryer 14. The second section 24 can have a generally cylindrical shape having the same radius as the first section 22. For example, as depicted in FIG. 1, the second section 24 is shaped as a cylindrical segment having a lower length 28, an upper length 29, and angled rim 30. Because the second section 24 is truncated at an angle to form the angled rim 30, the lower length 28 is longer than the upper length 29.

The second section 24 includes a interior mounting surface 32 to which the air compressor 12 and air dryer 14 can be mounted. For example, the air compressor 12 can be mounted to the lower portion of interior mounting surface 32 using brackets 34 depending from the air compressor 12, and, as discussed below, the air dryer 14 can be mounted to the upper portion of the interior mounting surface 32 using a channel bracket 36. Because the lower length 28 is longer than the upper length 29, the second section 24 serves in protecting the underside of the air compressor 12, while simultaneously affording access for maintenance from above.

Operation of the air compressor 12 serves to provide compressed air at between 35 and 170 lbs/in$^2$ for the supply module 10. As those skilled in the art will appreciate, the air compressor 12 is connected to the battery, and can be selected from a variety of types and can have various configurations. For example, the air compressor 12 can be a 12 or 24 V oil-less reciprocating piston compressor such as Thomas Industries, Inc. Model No. VX050HJ. Lines 38 and 39 are provided to carry compressed air from the compression chambers 40A and 40B of the air compressor 12 to a T-connector 42, and a line 44 fluidly connects the T-connector 42 to the air dryer 14.

If an oil-less air compressor is not used, a coalescing filter (not shown) can be provided along the line 44. A coalescing filter provided along line 44 can remove contaminants from the compressed air provided by the air compressor 12. As those skilled in the art will appreciate, the coalescing filter can be selected from a variety of types and may have various configurations.

The air dryer 14 serves to remove moisture from the compressed air provided by the air compressor 12 so that dry compressed air can be supplied to the reservoir 16. As those skilled in the art will appreciate, the air dryer 14 can be selected from a variety of types and may have various configurations. For example, the air dryer 14 can be a membrane air dryer such as Air Products Corp. Prism® air dryer, Model No. PE1015-E1-3A-00 or a desiccant air dryer such as Bendix AD-9™, AD-IS®, and AD-IP™ air dryers.

As depicted in FIGS. 1-4, the air dryer 14 is a membrane air dryer having an input end E1 and an output end E2. As discussed above, the air dryer 14 can be attached to the shell 18 using a channel bracket 36. The channel bracket 36, as depicted in FIGS. 2 and 3, can be formed from a C-shaped channel. The channel bracket 36 can be removably mounted to the shell 18 using mechanical fasteners (not shown), or can otherwise be secured to the shell 18. The channel bracket 36 includes a connecting leg 46 and depending legs 48 and 49 extending outwardly from the connecting leg 46. The air dryer 14 can be secured to the connecting leg 46 of the channel bracket using clamps 50 and mechanical fasteners 51.

A pressure protection valve 52 can also be attached to the connecting leg 46 of the channel bracket 36. The pressure protection valve 52 is fluidly connected to the output end E2 of the air dryer 14 by a line 54. When a membrane air dryer is utilized as the air dryer 14, the pressure protection valve 52 serves to provide back pressure in the line 54. For example, the pressure protection valve 52 opens only when the pressure in the line 54 is above a specified threshold pressure. As such, when a membrane air dryer is utilized as the air dryer 14, the pressure protection valve 52 provides back pressure in the line 54 that is necessary for operation thereof.

A switching mechanism or a T-connector 56 and sweep line 57 can also be provided when a membrane air dryer is utilized as the air dryer 14. The switching mechanism or T-connector 56 and sweep line 57 are provided to allow continuous drying of the compressed air. As depicted in FIG. 4, the switching mechanism or T-connector 56 is provided along the line 54 between the air dryer 14 and pressure protection valve 52. Furthermore, the sweep line 57 is provided to connect the switching mechanism 56 to the air dryer 14 at a purge air input 58. The switching mechanism or T-connector 56 serves to redirect compressed air through the sweep line 57 into the purge air input 58.

The pressure protection valve 52 is fluidly connected to the reservoir 16 by a line 60 which delivers dry compressed air from the air dryer 14 thereto. The reservoir 16 stores the dry compressed air provided by the air compressor 12 and air dryer 14. The reservoir 16 includes an input port 62, an output port 63, a control port 64, and a drain port 65.

The drain port 65 can be connected to a drain valve (not shown). The drain valve allows the reservoir 16 to be drained of dry compressed air and/or other accumulants. Furthermore, the line 60 is fluidly connected to the input port 62, and the output port 63 is fluidly connected by a line 66 to the equipment requiring dry compressed air. Such equipment includes, as discussed above, air horns, air suspension systems, central tire inflation systems, and air supply systems on air-braked commercial vehicles. If necessary, a control valve (not shown) can be provided along line 66 to control the flow of the dry compressed air from the supply module 10. The control valve could be actuated according to the demands of the equipment requiring the dry compressed air.

A governor 70 can be fluidly connected to the control port 64 by a line 72. The governor 70 can be a Bendix D-2 governor, and can be used to monitor the pressure in the reservoir 16. The governor 70 can provide an output indicating whether the pressure in the reservoir 16 is above or below a specified set-point. The governor 70 can fluidly communicate with a pressure switch 74 through a line 76. Together, the governor 70 and pressure switch 74 can be used to actuate the air compressor 12 to charge the reservoir 16. The pressure switch 74 can be a Bendix LP-3 pressure indicator, and can provide an electrical signal corresponding to the output of the governor 70.

For example, if the pressure in the reservoir 16 is below the specified set-point, the governor 70 does not allow compressed air to pass through the line 76 to the pressure switch 74, and if the pressure in the reservoir 16 is above the specified set-point, the governor 70 does allow compressed air to pass through the line 76 to the pressure switch 74. The pressure switch 74 can be configured so that an electrical signal is provided corresponding to the state of the reservoir 16 when air does not pass through the line 76, and another electrical signal is provided corresponding to the state of the reservoir 16 when air does pass through the line 76. The electrical signals provided by the pressure switch 74 can be relayed to an electrical breaker (not shown) to operate the air compressor 12.

As an alternative to using both the governor 70 and pressure switch 74, a pressure switch communicating with the interior of the reservoir 16 can be used. Such a pressure switch could sense the pressure in the reservoir 18, and provide electrical signals relayed to the electrical breaker corresponding to whether the pressure in the reservoir 16 is higher or lower than the specified set-point. As discussed below, the electrical signals provided by such a pressure switch can serve in operating the air compressor 12.

Depending on the electrical signals received from the pressure switch 74, the electrical breaker can activate or deactivate the air compressor 12. When the electrical signals indicate that the pressure in the reservoir is lower than the set-point, the electrical breaker can activate operation of the air compressor 12 if the air compressor 12 is in the off-state, and maintain the air compressor 12 in the on-state, if the air compressor 12 is already operating. Furthermore, when the electrical signals indicate that the pressure in the reservoir 16 is higher than the set-point, the electrical breaker can deactivate operation of the air compressor 12 if the air compressor 12 is in the on-state, and maintain the air compressor 12 in the off-state if the air compressor 12 is already not operating. As such, as the dry compressed air in the reservoir 16 is discharged to supply the demands of the equipment, the air compressor 12 can be operated to recharge the reservoir 16.

As discussed above, the air module 10 is attached to the frame F using upper and lower clamping members 20A and 20B. The upper and lower clamping members 20A and 20B can be fastened to the frame F, and the shell 18 can be clamped therebetween. For example, two (2) pairs of clamping members 20A and 20B can be spaced along the exterior surface of the shell 18 to secure the supply module 10 to the frame F. For example, one pair of clamping members 20A and 20B is depicted in FIG. 1, and the other pair of clamping members 20A and 20B is depicted in FIG. 2.

As depicted in FIG. 2, the clamping members 20A and 20B can include contoured sections 84 to accommodate the generally cylindrical shape of the first section 22 and second section 24 of the shell 18, and legs 86 and legs 88 can extend outwardly from the ends of the contoured sections 84. The legs 86 are L-shaped, and can be apertured to accept mechanical fasteners 90 used to fasten the clamping brackets 20A and 20B to the frame F. If necessary, spacers 91 can be used to space the supply module 10 from the frame F. The legs 88 are apertured to accept studs 92, and nuts 93 can be received on either end of the studs 92 to clamp the shell between the clamping members 20A and 20B.

While in accordance with the Patent Statutes, only the best mode and exemplary embodiments have been presented and described in detail, it is to be understood that the invention is not limited thereto or thereby.

The invention claimed is:

1. A dry compressed air module attached to a frame of a vehicle, comprising:
    a shell for attachment to the frame, the shell including a first section and a second section;
    an air compressor disposed on said shell, the second section being shaped as a cylindrical segment having an upper length and a lower length, said lower length being longer than said upper length so that said shell can protect said air compressor, while still affording access for maintenance;
    an air dryer disposed on said shell, and provided with compressed air from said air compressor; and
    a reservoir disposed on said shell, and provided with dry compressed air from said air dryer, said reservoir capable of storing and supplying the dry compressed air to the vehicle, wherein said air compressor, said air dryer, and said reservoir can be collectively attached to the frame using said shell.

2. A module according to claim 1, wherein said air dryer is a membrane air dryer.

3. A module according to claim 1, wherein said air dryer is attached to said shell by a channel bracket removably mounted to said shell.

4. A module according to claim 1, wherein said reservoir is formed by said shell and bulkheads attached to said shell.

5. A module according to claim 4, wherein said bulkheads are attached to said first section to form said reservoir, and wherein said air compressor and said air dryer are attached to said second section.

6. A module according to claim 1, further comprising a pressure switch responding to the pressure in said reservoir to operate said air compressor.

7. A module according to claim 6, wherein, under a predetermined pressure condition, said pressure switch activates said air compressor to recharge said reservoir.

8. A self-contained system for supplying dry compressed air to a destination, comprising:
    a shell including a first section and a second section;
    an air compressor disposed on said shell, the second section being shaped as a cylindrical segment having an upper length and a lower length, said lower length being longer than said upper length so that said shell can protect said air compressor, while still affording access for maintenance;
    an air dryer disposed on said shell, said air dryer fluidly communicating with said air compressor; and
    a reservoir disposed on said shell, said reservoir fluidly communicating with said air dryer, wherein said air compressor provides compressed air to said air dryer, said air dryer provides dry compressed air to said reservoir, and said reservoir stores the dry compressed air, and supplies the dry compressed air to the destination, the self-contained system capable of being modularly attached to the destination.

9. A self-contained system according to claim 8, wherein said air dryer is a membrane air dryer.

10. A self-contained system according to claim 8, wherein said shell is used to collectively attach said air compressor, said air dryer, and said reservoir to the destination.

11. A self-contained system according to claim 10, wherein said reservoir is formed by said shell and bulkheads attached to said shell.

12. A self-contained system according to claim 8, further comprising a pressure switch responding to the pressure in the reservoir to operate said air compressor.

13. A module according to claim 12, wherein, under a predetermined pressure condition, said pressure switch activates said air compressor to recharge said reservoir.

14. A method for supplying dry compressed air to a destination, comprising:
    providing an air compressor, an air dryer, and a reservoir on a shell including a first section and a second section, the second section being shaped as a cylindrical segment having an upper length and a lower length, said lower length being longer than said upper length so that said shell can protect said air compressor, while still affording access for maintenance;
    attaching the air compressor, the air dryer, and the reservoir collectively to the destination using the shell;
    generating compressed air using the air compressor;
    drying the compressed air provided by the air compressor using the air dryer;
    storing the dry compressed air provided by the air dryer using the reservoir; and
    providing the dry compressed air to the destination from the reservoir.

15. A method according to claim 14, wherein the air dryer is a membrane air dryer.

16. A method according to claim 14, further comprising recharging the reservoir with dry compressed air.

17. A method according to claim 14, further comprising activating the air compressor in response to a predetermined pressure condition in the reservoir.

* * * * *

UNITED STATES PATENT AND TRADEMARK OFFICE
CERTIFICATE OF CORRECTION

PATENT NO. : 7,637,985 B2
APPLICATION NO. : 11/393599
DATED : December 29, 2009
INVENTOR(S) : Hoffman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 738 days.

Signed and Sealed this

Ninth Day of November, 2010

David J. Kappos
*Director of the United States Patent and Trademark Office*